(12) United States Patent
Miyazaki et al.

(10) Patent No.: US 9,866,020 B2
(45) Date of Patent: Jan. 9, 2018

(54) ELECTRIC POWER CONTROL METHOD, ELECTRIC POWER CONTROL DEVICE, AND ELECTRIC POWER CONTROL SYSTEM

(71) Applicant: Panasonic Intellectual Property Management Co., Ltd., Osaka (JP)

(72) Inventors: Seiya Miyazaki, Hyogo (JP); Takahiro Kudoh, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 359 days.

(21) Appl. No.: 14/754,528

(22) Filed: Jun. 29, 2015

(65) Prior Publication Data

US 2015/0303690 A1   Oct. 22, 2015

Related U.S. Application Data

(63) Continuation of application No. PCT/JP2014/003186, filed on Jun. 16, 2014.

(30) Foreign Application Priority Data

Jul. 9, 2013   (JP) .................................. 2013-143417

(51) Int. Cl.
*H02J 3/00* (2006.01)
*H02J 7/34* (2006.01)
(Continued)

(52) U.S. Cl.
CPC ................ *H02J 3/00* (2013.01); *G05B 15/02* (2013.01); *H02J 3/32* (2013.01); *H02J 3/381* (2013.01);
(Continued)

(58) Field of Classification Search
CPC ...... H02J 3/00; H02J 3/32; H02J 3/318; H02J 7/34; H02J 3/383; H02J 3/387; H02J 7/35;
(Continued)

(56) References Cited

U.S. PATENT DOCUMENTS

2009/0018705 A1*   1/2009   Ouchi ...................... H02J 3/14
                                                                  700/291
2013/0261825 A1*   10/2013   Han ........................ G06F 1/26
                                                                  700/291
(Continued)

FOREIGN PATENT DOCUMENTS

EP     1729223 A2 *  12/2006   ............. G06Q 10/04
JP     2006-109621      4/2006

OTHER PUBLICATIONS

International Search Report of PCT application No. PCT/JP2014/003186 dated Aug. 26, 2014.

*Primary Examiner* — Sean Shechtman
*Assistant Examiner* — Tri T Nguyen
(74) *Attorney, Agent, or Firm* — Greenblum & Bernstein, P.L.C.

(57) ABSTRACT

An electric power control method according to an aspect of the present disclosure includes determining a control threshold value at a start of a demand time period based on a demand target value, measuring an amount of demand electric power of a customer which has received an electric power supply from an external power source and consumed electric power from the start of the demand time period to an arbitrary time point during the demand time period, updating the control threshold value based on the measured amount of demand electric power and the demand target value, and supplying electric power to the customer from a distributed power source when an instantaneous value of an electric (Continued)

power consumption of the customer exceeds the control threshold value during the demand time period.

12 Claims, 8 Drawing Sheets

(51) Int. Cl.
    *H02J 3/32*           (2006.01)
    *H02J 3/38*           (2006.01)
    *G05B 15/02*         (2006.01)
    *H02J 7/35*           (2006.01)

(52) U.S. Cl.
    CPC ............... *H02J 7/34* (2013.01); *H02J 3/383* (2013.01); *H02J 3/387* (2013.01); *H02J 7/35* (2013.01); *Y02E 10/563* (2013.01); *Y02E 10/566* (2013.01); *Y02E 70/30* (2013.01)

(58) Field of Classification Search
    CPC ..... G05B 15/02; H02E 10/563; H02E 10/566; H02E 70/30
    See application file for complete search history.

(56) References Cited

U.S. PATENT DOCUMENTS

2013/0325198 A1* 12/2013 Mansfield ................. H02J 3/32
                                                                   700/291
2014/0330695 A1* 11/2014 Steven ............... G06Q 30/0283
                                                                   705/37

* cited by examiner

ELECTRIC POWER CONTROL METHOD, ELECTRIC POWER CONTROL DEVICE, AND ELECTRIC POWER CONTROL SYSTEM

BACKGROUND

1. Technical Field

The present disclosure relates to an electric power control method, an electric power control device, and an electric power control system for controlling a distributed power source provided on the customer's side.

2. Description of the Related Art

In the past, there has been a mechanism of an electric rate in which contract electric power is determined based on the magnitude of average electric power (a demand value) in each interval (demand time period) of a fixed time (for example, 30 minutes) and a basic rate is calculated from this contract electric power.

In Japanese Unexamined Patent Application Publication No. 2006-109621, an electric power system including a storage battery, the electric power system with the aim of reducing the contract electric power, is disclosed. In this system, a target value of a demand value is set for a demand time period and, if an instantaneous value of electric power consumption exceeds the target value, the storage battery is discharged. By supplementing the electric power supply of a commercial power source with the electric power supply from the storage battery, the demand value is prevented from exceeding the target value.

SUMMARY

As described above, the contract electric power is determined by the average electric power in the demand time period, not the instantaneous value of the electric power consumption; the technique of Japanese Unexamined Patent Application Publication No. 2006-109621 has a problem of discharge control of the distributed power source such as the storage battery, the discharge control being performed even though the value of the average electric power does not exceed the target value of the demand value.

One non-limiting and exemplary embodiment provides an electric power control method that can prevent unnecessary discharge of a distributed power source while preventing a demand value from exceeding a target value by discharge of the distributed power source such as a storage battery.

In one general aspect, the techniques disclosed here feature an electric power control method including determining a control threshold value at a start of a demand time period based on a demand target value, measuring an amount of demand electric power of a customer which has received an electric power supply from an external power source and consumed electric power from the start of the demand time period to an arbitrary time point during the demand time period, updating the control threshold value based on the measured amount of demand electric power and the demand target value, and supplying electric power to the customer from a distributed power source when an instantaneous value of an electric power consumption of the customer exceeds the control threshold value during the demand time period.

With the electric power control method according to the aspect of the present disclosure, it is possible to prevent a demand value from exceeding a target value by discharge of a distributed power source while preventing unnecessary discharge of the distributed power source.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

<Underlying Knowledge Forming Basis of the Present Disclosure>

In the existing technique described in the "Description of the Related Art" section, control by which a storage battery is discharged if an instantaneous value of electric power consumption exceeds a target value of a demand value (hereinafter referred to as a "demand target value") is performed, but the study conducted by the inventors has revealed that unnecessary discharge of the storage battery is performed in specific circumstances.

That is, even when an instantaneous value of electric power consumption exceeds the demand target value in a short period in a demand time period, an average demand value in a longer period sometimes does not exceed the demand target value. Also in such a case, in the existing technique, control by which the storage battery is discharged is performed if an instantaneous value of electric power consumption exceeds the demand target value, which results in unnecessary discharge of the storage battery. Such an example is depicted in FIG. 1.

Figure 1:
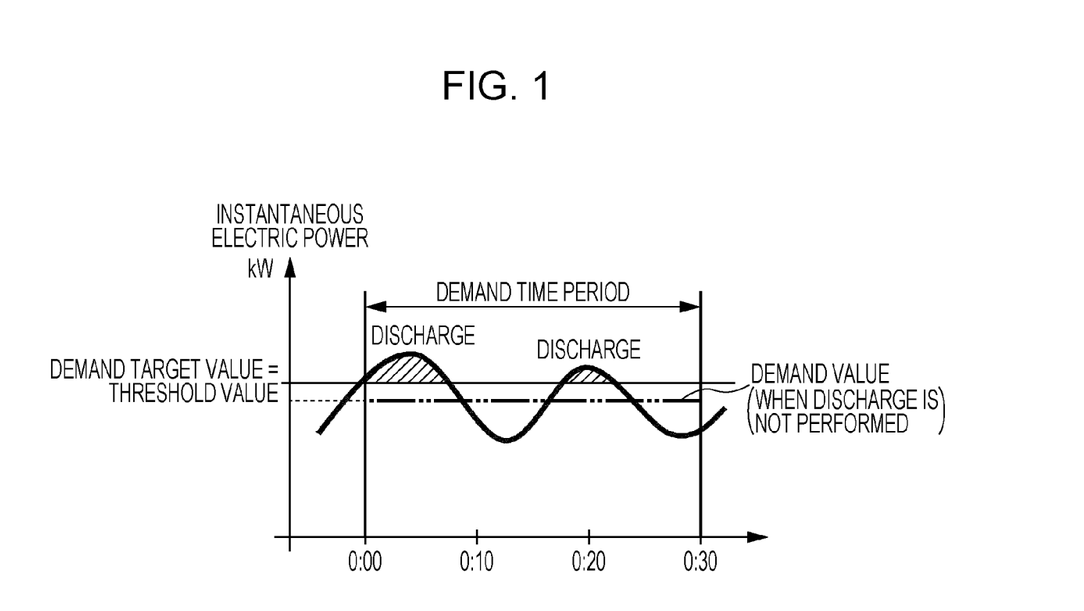
FIG. 1 is a diagram for explaining a problem of the existing technique.

In the example of FIG. 1, the storage battery is discharged if an instantaneous value of electric power consumption exceeds a demand target value; however, since a demand value (indicated by a chain double-dashed line) in a demand time period is below the demand target value even when discharge is not performed, this discharge is accordingly unnecessary discharge of the storage battery.

Since such unnecessary discharge of the storage battery results in degradation of the storage battery caused by repeated charge and discharge and can cause a shortage of the amount of charge sufficient for performing discharge for a high peak or successive peaks, there is a need to prevent such unnecessary discharge as much as possible.

Thus, in an aspect according to the present disclosure, by updating a threshold value for discharge control of the storage battery during a demand time period, an attempt to prevent unnecessary discharge of the storage battery while preventing a demand value from exceeding a demand target value is made.

Embodiment 1

Hereinafter, an embodiment will be described with reference to the drawings.

<Configuration>

Figure 2:
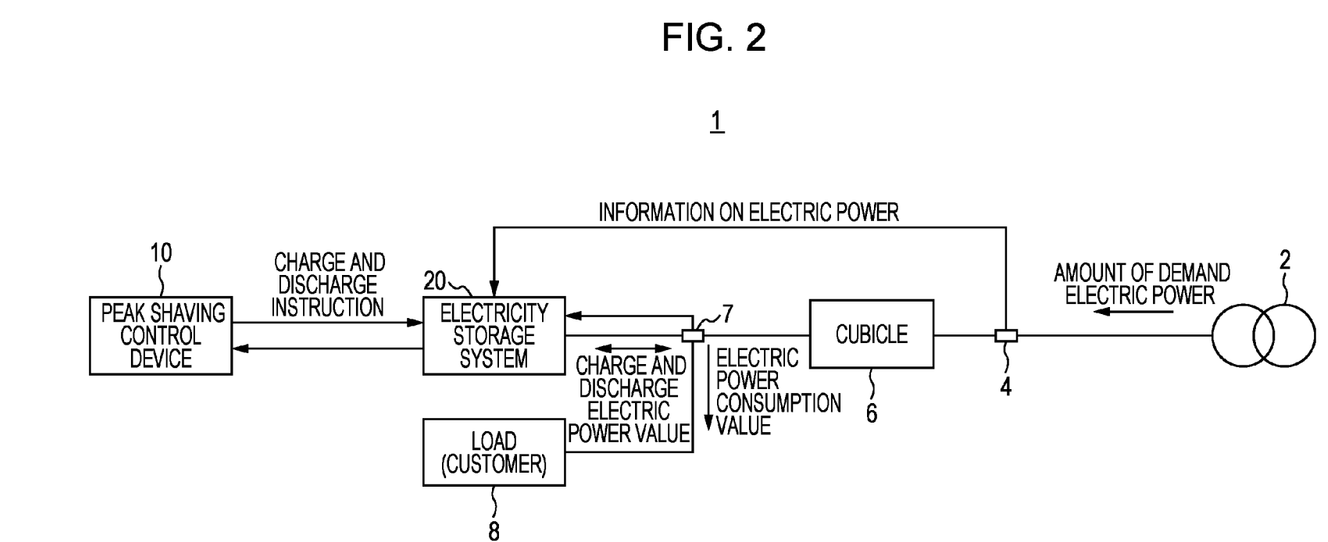
FIG. 2 is a configuration diagram of an electric power supply system.

FIG. 2 is a configuration diagram of an electric power supply system according to the embodiment.

In an electric power supply system 1, a high voltage received from a commercial power source 2 is transformed by a cubicle 6 and supplied to a load 8. Incidentally, the cubicle 6 is a type of power receiving facility and transforms the received high voltage. For example, the cubicle 6 transforms received 6600 VAC to 100 VAC or 200 VAC and supplies the resultant voltage to the load 8.

Moreover, on the customer's side, an electricity storage system 20 including a storage battery that stores the electric power which is supplied from the commercial power source 2 is provided. A peak shaving control device 10 performs charge and discharge control of the storage battery of the electricity storage system 20.

At the time of charge, the electricity storage system 20 converts the alternating-current electric power which is supplied via the cubicle 6 into a direct current by an AC/DC converter (not depicted in the drawing) and charges the storage battery. At the time of discharge, the electricity storage system 20 converts the direct-current electric power discharged from the storage battery into an alternating current by a DC/AC converter (not depicted in the drawing) and supplies the alternating current to the load 8.

An electric power monitor 4 measures the current and the voltage flowing through a power-supply line and measures the input electric power from the commercial power source 2 based on the measurement result. The electricity storage system 20 receives the information on the electric power indicating the input electric power measured by the electric power monitor 4 and uses the information to prevent a backflow.

The electric power monitor 7 repeatedly measures a charge and discharge electric power value of charge and discharge of the electricity storage system 20 and an electric power consumption value consumed by the load 8. The measurement results are sent to the peak shaving control device 10 via the electricity storage system 20.

Figure 3:
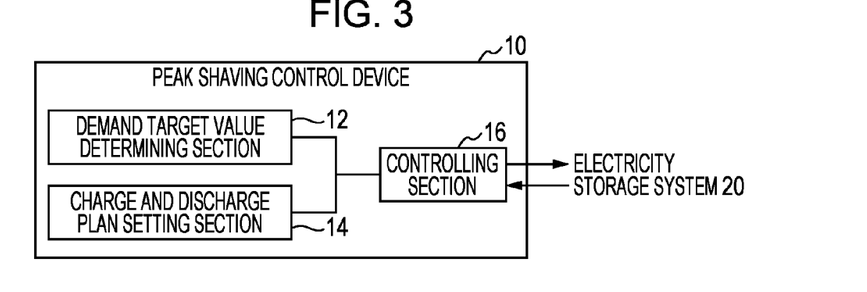
FIG. 3 is a configuration diagram of a peak shaving control device.

FIG. 3 is a configuration diagram of the peak shaving control device 10.

The peak shaving control device 10 includes a demand target value determining section 12, a charge and discharge plan setting section 14, and a controlling section 16.

The demand target value determining section 12 determines a demand target value.

The charge and discharge plan setting section 14 sets a schedule of charge and discharge of the storage battery of the electricity storage system 20. For example, the charge and discharge plan setting section 14 sets a schedule by which the storage battery is charged at night.

Incidentally, the determination made by the demand target value determining section 12 and the setting made by the charge and discharge plan setting section 14 are performed by an operation which is performed by an operator, for example.

The controlling section 16 repeatedly acquires the charge and discharge electric power value of charge and discharge and the electric power consumption value measured by the electric power monitor 7 from the electricity storage system 20. If the electric power consumption value exceeds a control threshold value, the controlling section 16 gives an instruction to the electricity storage system 20 to discharge the storage battery.

Such a storage battery discharge instruction includes the following types of instruction.

A command value instruction: a direct instruction about an output value of the storage battery, such as fixed X [kW] output for 5 minutes.

A flow value instruction: an instruction to set the flow of demand electric power, such as instantaneously changing the output of the storage battery while performing measurement such that a flow value becomes Y [kW].

Moreover, the controlling section 16 sets the control threshold value at the start of a demand time period, calculates the amount of demand electric power of a customer which has received the electric power supply from the commercial power source 2 and consumed the electric power until an elapsed time from the start of the demand time period during the demand time period, and updates the control threshold value based on the calculated amount of demand electric power and the demand target value.

Since this amount of demand electric power is an electric power consumption value of the customer which has received the electric power supply from the commercial power source 2 and consumed the electric power, it is necessary to set the amount of demand electric power at a value determined in consideration of the presence or absence of charge.

That is, if charge and discharge of the storage battery are not performed (the charge and discharge electric power value is zero), the electric power consumption value measured by the electric power monitor 7 is used as it is. If discharge of the storage battery is performed, in consideration of peak shaving by discharge, a value obtained by subtracting a discharge electric power value from the electric power consumption value is used. On the other hand, if charge of the storage battery is performed, a value obtained by adding a charge electric power value to the electric power consumption value is used.

<Operation>

Figure 4:
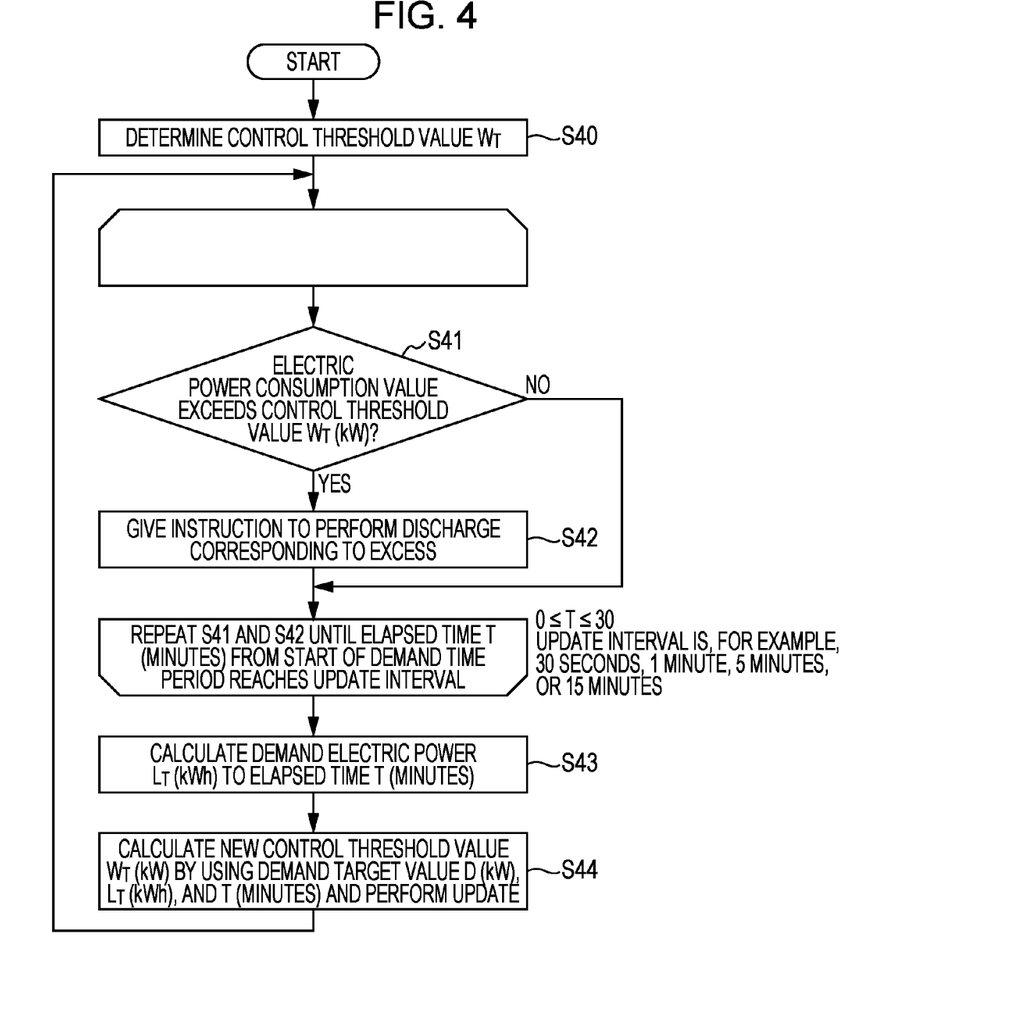
FIG. 4 is a flowchart depicting the flow of processing which is performed by a controlling section.

FIG. 4 is a flowchart depicting the flow of processing which is performed by the controlling section 16.

First, the controlling section 16 determines an initial value of a control threshold value $W_T$ (kW) based on the demand target value determined by the demand target value determining section 12 (S40). It is assumed here that this initial value of the control threshold value $W_T$ (kW) is the same value as the demand target value, but may be a value obtained by slightly increasing or decreasing the demand target value.

Next, the controlling section 16 acquires the electric power consumption value (kW) measured by the electric power monitor 7 from the electricity storage system 20 and, if the electric power consumption value (kW) thus acquired exceeds the current control threshold value $W_T$ (kW) (S41: Yes), the controlling section 16 sends, to the electricity storage system 20, an instruction to discharge the storage battery by an amount corresponding to the excess (S42).

The controlling section 16 repeatedly performs the processing in S41 and S42 until an elapsed time T (minutes) from the start of a demand time period reaches an update interval.

When the elapsed time T (minutes) reaches the update interval, the controlling section 16 calculates the amount of demand electric power $L_T$ (kWh) by adding up the demand electric power values (kW) from the start of the demand time period to the elapsed time T (minutes), the demand electric power values (kW) acquired from the electric power monitor 7 (S43). Incidentally, the demand electric power value is a value obtained by subtracting the amount of charge and discharge of a distributed power source from the electric power consumption of the customer. This makes it possible to give consideration also to the electric power value of charge and discharge if charge and discharge are performed.

Then, the controlling section 16 calculates a new control threshold value $W_T$ (kW) by using the demand target value D (kW), the amount of demand electric power LT (kWh), and the elapsed time T (minutes) and performs update (S44).

For this calculation, the following equation is used.

$$W_T = D + (D \times T/60 - L_T) \times 60/(30-T) \quad (1)$$

In Equation 1, "D×T/60" indicates the amount of electric power consumption observed when the electric power with the demand target value D (kW) is continuously used for the elapsed time T (minutes). To convert the amount to the amount of electric power consumption (kWh) per hour, division by 60 is performed. Moreover, "30−T" indicates the remaining time obtained by subtracting the elapsed time T (minutes) from the demand time period: 30 minutes.

"(D×T/60−$_T$)" is a difference between the amount of electric power consumption (D×T/60) observed when the electric power with the demand target value D (kW) is continuously used for the elapsed time T (minutes) and the amount of demand electric power $L_T$ (kWh) to the elapsed time T (minutes). If D×T/60>$L_T$, the second term of Equation 1 becomes positive and therefore the new control threshold value $W_T$ (kW) becomes a value which is greater than the demand target value D (kW). On the other hand, if D×T/60<$L_T$, the second term of Equation 1 becomes negative and therefore the new control threshold value $W_T$ (kW) becomes a value which is smaller than the demand target value D (kW).

As described above, Equation 1 means that, if the amount of demand electric power $L_T$ (kWh) from the start of the demand time period to the elapsed time T (minutes) undergoes a transition at a pace below the demand target value D (kW), by revising the control threshold value $W_T$ (kW) upwardly, discharge of the storage battery is prevented from being performed easily, whereby unnecessary discharge is prevented.

On the other hand, if the amount of demand electric power $L_T$ (kWh) from the start of the demand time period to the elapsed time T (minutes) undergoes a transition at a pace above the demand target value D (kW), by revising the control threshold value $W_T$ (kW) downwardly, discharge of the storage battery is facilitated.

In addition, based on the difference between the demand electric power and the demand target value, electric power consumption with which the demand value will become the demand target value if the electric power consumption is continuously used for the remaining time is set as a new control threshold value $W_T$ (kW). As a result, even when the electric power consumption value increases after the update of the control threshold value $W_T$ (kW), by discharging the storage battery under the condition that the electric power consumption value exceeds the control threshold value $W_T$ (kW), it is possible to suppress the demand value so as to be less than or equal to the demand target value.

Incidentally, the processing depicted in FIG. 4 is performed by the demand time period of 30 minutes. That is, when the demand time period is ended, the controlling section 16 resets the older control threshold value $W_T$ (kW) and performs the processing again from the processing in S40.

Example 1

Figure 5:
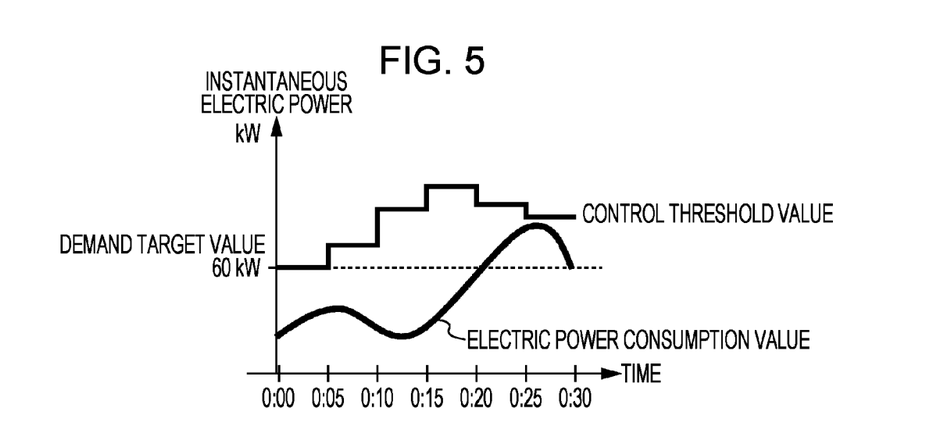
FIG. 5 is a diagram depicting an example of update of a control threshold value.

FIG. 5 is a diagram depicting Example 1 of update of the control threshold value.

At the start (0:00) of a demand time period (0:00 to 0:30), the control threshold value is 60 kW, which is the same as the demand target value. Then, the control threshold value is updated at intervals of 5 minutes, and, in particular, by the update in time slots (0:05, 0:10, 0:15) in which the electric power consumption value is below the demand target value, the control threshold value increases as compared to the demand target value. Since the control threshold value is increased in this manner, the electric power consumption value is below the control threshold value even in time slots (0:20 to 0:30) in which the electric power consumption value exceeds the demand target value (60 kW), discharge of the storage battery is not performed and, in addition thereto, the consequence result that the average electric power (demand value) of 30 minutes is below the demand target value is obtained. As described above, in the example of FIG. 5, it is possible to prevent unnecessary discharge of the storage battery while implementing a state in which the demand value does not exceed the demand target value.

Example 2

Figure 6:
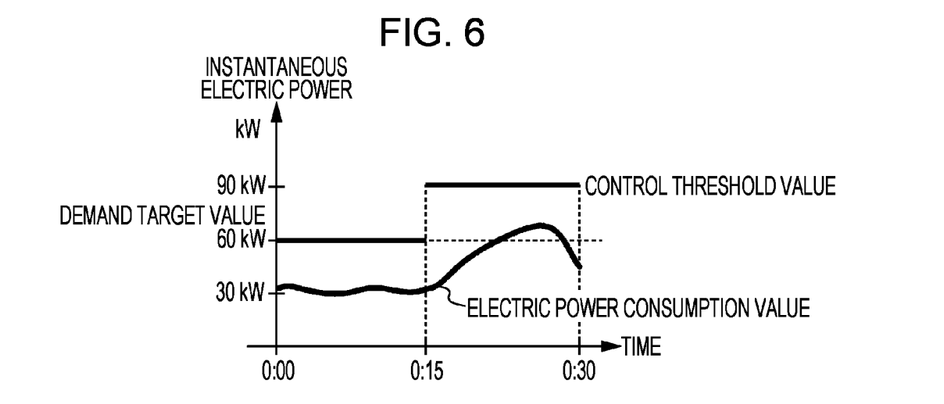
FIG. 6 is a diagram depicting an example of update of the control threshold value.

FIG. 6 is a diagram depicting Example 2 of update of the control threshold value.

At the start (0:00) of a demand time period (0:00 to 0:30), the control threshold value is 60 kW, which is the same as the demand target value.

The electric power consumption value in the first 15 minutes (0:00 to 0:15) undergoes a transition at 30 kW which is about half of the demand target value: 60 kW, and $L_T$ is 30 kW×15/60 (h)=7.5 kWh.

In this case, the controlling section 16 substitutes D=60, T=15, and $L_T$=7.5 into Equation 1 and updates the control threshold value $W_T$ to 90 (kW) by $$W_T = 60 + (60 \times 15/60 - 7.5) \times 60/(30-15)$$

$$W_T = 60 + 7.5 \times 4 = 90.$$

<Update of the Control Threshold Value>

Update of the control threshold value is not limited to the method using Equation 1 described above and may be any method as long as the method is a calculation method implementing update by which, when the amount of demand electric power to a time point of update is compared with the total amount which is the amount observed when consumption of the electric power with a fixed demand target value is continued from the start of a demand time period to the time point of update, if the amount of demand electric power<the total amount, the control threshold value is increased; if the amount of demand electric power>the total amount, the control threshold value is reduced.

Moreover, in particular, if the amount of demand electric power<the total amount, it is preferable to obtain a result of (the total amount−the amount of demand electric power)÷(a time between a time point of update and the end of the demand time period) and add the value thus obtained to the control threshold value.

By this calculation equation, based on the difference between the amount of demand electric power from the start of the demand time period to a time point of update and the demand target value, electric power consumption with which the demand value will become the demand target value if the electric power consumption is continuously used for the remaining time is set as a new control threshold value $W_T$. This makes it possible to prevent unnecessary discharge of the storage battery while suppressing the demand value so as to be less than or equal to the demand target value. This calculation equation is useful especially in a case where an electric power consumption value in the first half of a demand time period is small as in FIGS. 5 and 6.

<Behavior of the Electricity Storage System>

A specific example of the behavior of the electricity storage system observed when the electric power consumption value exceeds the control threshold value will be described.

When the storage battery is discharged under the condition that the electric power consumption value exceeds the control threshold value $W_T$ (kW), as a method for giving a discharge instruction to the electricity storage system, there are two ways: a command value instruction and a flow value instruction.

In the case of a command value instruction, if the result of the control threshold value—the demand target value is positive, a direct instruction to perform discharge by an amount corresponding to a value of the difference with the rating being set as an upper limit is given; if the result of the control threshold value—the demand target value is negative, discharge is not performed. Incidentally, in some electricity storage systems, consecutive command value instructions cannot given and only discrete instructions are possible; in such a case, the amount of discharge is rounded up.

In the case of a flow value instruction, the control threshold value is set as a flow control set value exclusively for discharge. Here, the flow control exclusively for discharge is control by which, if the demand electric power exceeds the flow control set value, control is performed such that the flow becomes constant by performing discharge by an amount corresponding the excess, but, since discharge is not performed when the demand electric power does not exceed the flow control set value, the flow becomes lower than a flow set value. As similar control, there is flow control exclusively for charge, which is control by which charge is performed to the point where the flow set value is not exceeded. This is used in charge by which the demand target value is not exceeded, which will be described later.

The difference between the command value instruction and the flow value instruction is as follows: in the case of the command value instruction, the storage battery outputs fixed electric power until a new control threshold value is set; in the case of the flow value instruction, the output of the storage battery varies depending on the electric power consumption of the customer and, instead, the demand electric power becomes constant.

Embodiment 2

In Embodiment 2, an attempt to perform appropriate discharge control of the storage battery is made by predicting the amount of electric power consumption in a demand time period and performing update of a control threshold value based on the amount of demand electric power and the predicted value of the amount of electric power consumption.

Figure 7:
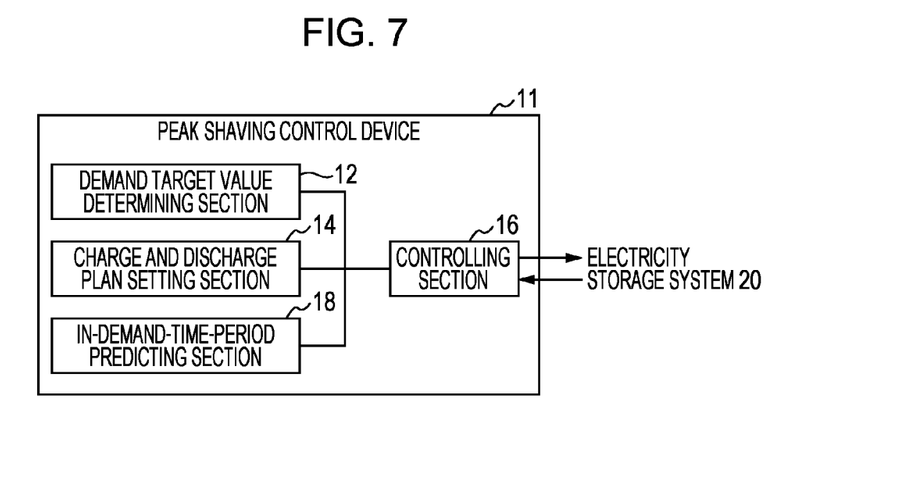
FIG. 7 is a configuration diagram of a peak shaving control device.

FIG. 7 is a configuration diagram of a peak shaving control device 11. The portions identified with the same reference numerals as those in FIG. 3 are similar to the portions described in FIG. 3.

The peak shaving control device 11 includes an in-demand-time-period predicting section 18 that predicts the amount of electric power consumption in a demand time period.

Figure 8:
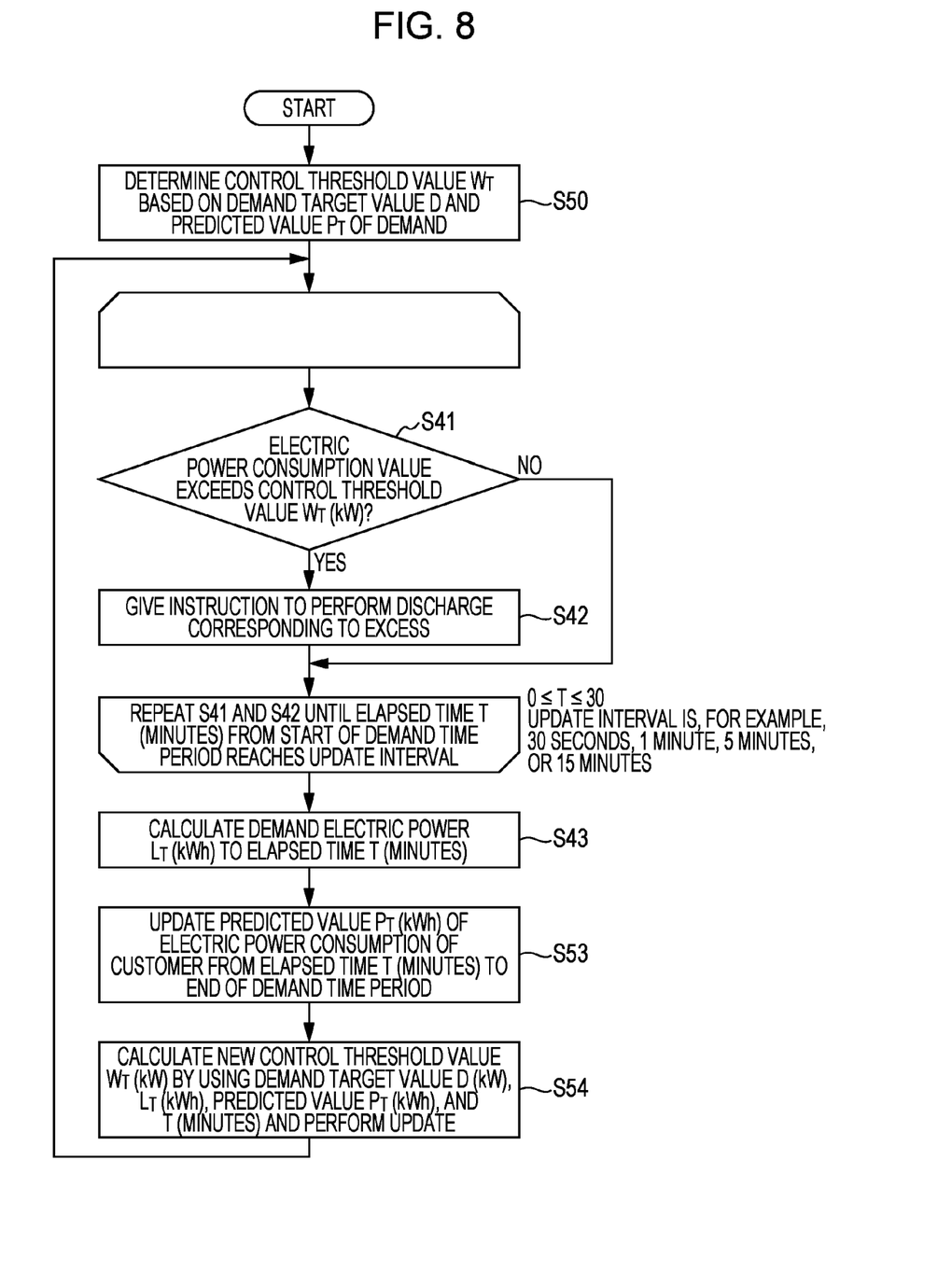
FIG. 8 is a flowchart depicting the flow of processing which is performed by the controlling section.

FIG. 8 is a flowchart depicting the flow of processing which is performed by the controlling section 16. The portions identified with the same step numbers as those in FIG. 4 are similar to the portions in FIG. 4 and therefore descriptions thereof are omitted.

At the start of a demand time period, the in-demand-time-period predicting section 18 calculates a predicted value $P_T$ (kWh) of the amount of electric power consumption of the customer, the amount of electric power consumption to the end of the demand time period. The calculation method will be described later.

Then, the controlling section 16 determines an initial value of a control threshold value $W_T$ (kW) based on the demand target value determined by the demand target value determining section 12 and the predicted value $P_T$ (kWh) (S50).

Next, the controlling section 16 repeats the processing in steps S41 and S42 until an elapsed time T (minutes) reaches an update interval.

When the elapsed time T (minutes) reaches the update interval, the controlling section 16 calculates the amount of demand electric power $L_T$ (kWh) by adding up the demand electric power values (kW) to the elapsed time T (minutes) (S43).

Next, the controlling section 16 updates the predicted value $P_T$ (kWh) of the amount of electric power consumption of the customer, the amount of electric power consumption from the elapsed time T (minutes) to the end of the demand time period (S53).

Then, the controlling section 16 calculates a new control threshold value $W_T$ (kW) by using the demand target value D (kW), the elapsed time T (minutes), the amount of demand electric power $L_T$ (kWh) to the elapsed time T (minutes), and the predicted value $P_T$ (kWh) of the amount of electric power consumption from the elapsed time T (minutes) and performs update (S54).

In this calculation, the following equation is used.

$$W_T D + (D/2 - L_T - P_T) \times 60/(30 - T) \qquad (2)$$

Incidentally, if T=0 and $L_T$=0 in Equation 2, the equation becomes a calculation equation for obtaining the control threshold value $W_T$ (kW) in step S50.

<Method for Calculating the Predicted Value $P_T$>

As a method for calculating the predicted value $P_T$ (kWh) of the amount of electric power consumption of the customer to the end of the demand time period, there is a method for calculating the predicted value $P_T$ (kWh) of the amount of electric power consumption of the customer to the end of the demand time period by using the average value of the amounts of electric power consumption in the past given period.

For example, if the demand time period is 0:00 to 0:30, when the predicted value $P_T$ (kWh) is calculated at 0:00, calculating the predicted value $P_T$ (kWh) by averaging the amounts of electric power consumption in the past three days in the same time slot (0:00 to 0:30) as the remaining time slot (0:00 to 0:30) of the demand time period is possible.

Moreover, if the demand time period is 0:00 to 0:30, when the predicted value $P_T$ (kWh) is calculated at 0:15, calculating the predicted value $P_T$ (kWh) by averaging the amounts of electric power consumption in the past three days in the same time slot (0:15 to 0:30) as the remaining time slot (0:15 to 0:30) of the demand time period is possible.

In addition to the methods described above, a calculation method using a prediction method with consideration given to the trend of time-series data such as a neural network and an autoregressive (AR) model and a calculation method using the external information such as a weather forecast and a forecast about the temperature may be used.

Operational Example

Figure 9:
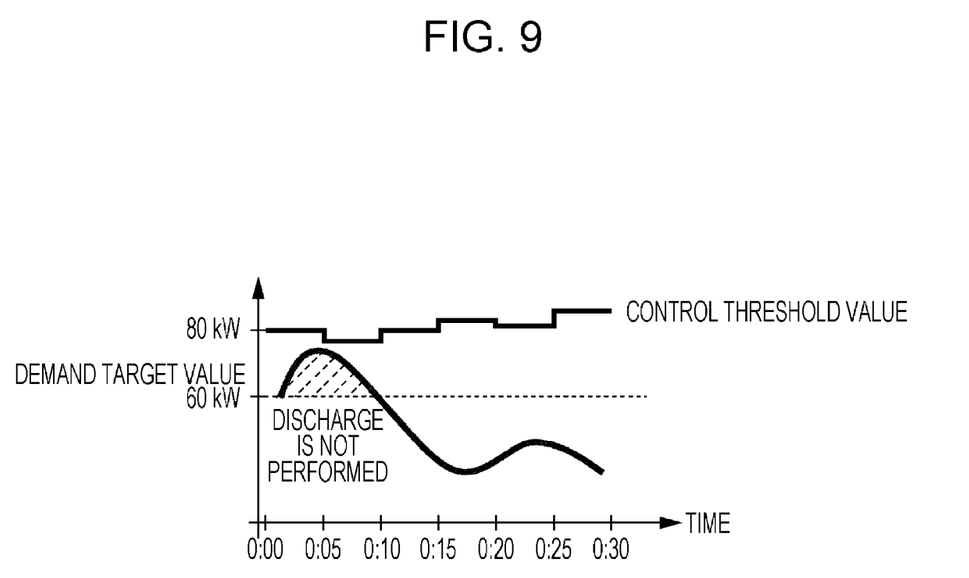
FIG. 9 is a diagram depicting an example of update of the control threshold value.

FIG. 9 is a diagram depicting an example of update of the control threshold value.

At the start (0:00) of a demand time period (0:00 to 0:30), a control threshold value is 80 kW which is greater than a demand target value. This is because a predicted value in the remaining time slot (0:00 to 0:30) of the demand time period is a small value: $P_0=20$.

Specifically, $L_T$ and T=0, D=60, and $P_0$=20 are substituted into Equation 2 and $$W_T D + (D/2 - L_T - P_T) \times 60/(30-T)$$

$$W_T = 80,$$

whereby the control threshold value $W_T$ at the start (0:00) is 80 (kW).

As described above, since the control threshold value is increased in the first-half time slot (0:00 to 0:10), the electric power consumption value is below the control threshold value even in a time slot (0:00 to 0:10) (indicated by an area which is diagonally shaded with broken lines in FIG. 9) in which the electric power consumption value exceeds the demand target value (60 kW), which eliminates the need for unnecessary discharge of the storage battery.

<An Object Whose Predicted Value is to be Calculated>

Incidentally, in this embodiment, descriptions have been given by taking up the electric power consumption of the customer as an example of an object whose predicted value is to be calculated, but the example is not limited thereto.

For example, when a solar battery and a fuel cell are set on the customer's side, predictions about the outputs of the solar battery and the fuel cell may be made. The prediction about the output of the solar battery can be made by using the information on the weather, the amount of solar radiation, the number of hours of sunshine, and so forth.

Moreover, the prediction about the output of a storage battery which is not an object whose charge and discharge is to be controlled may be included.

Embodiment 3

In this embodiment, a method of charge control which is performed by the controlling section 16 will be described.

In Embodiment 1 and Embodiment 2, the method of discharge control has been described; if the power source is a secondary battery and needs to be charged, when charge is required, there is a need for a mechanism that performs charge without exceeding a demand target value also at the time of charge as is the case in discharge.

Control which is performed at the time of charge is the same as that in Embodiments 1 and 2 to the stage of calculation of a control threshold value, and, by performing charge without exceeding the control threshold value, it is possible to perform charge without exceeding the demand target value. On the other hand, if both charge and discharge are performed in the same demand time period, such charge and discharge are unnecessary charge and discharge and have to be prevented. Hereinafter, the control method therefor will be described.

<Control Method Part 1>

A first control method will be described by using FIGS. 10 and 11. The aim of this method is to prevent excessive charge and discharge by reducing an opportunity in which both charge and discharge are performed in the same demand time period.

Figure 10:
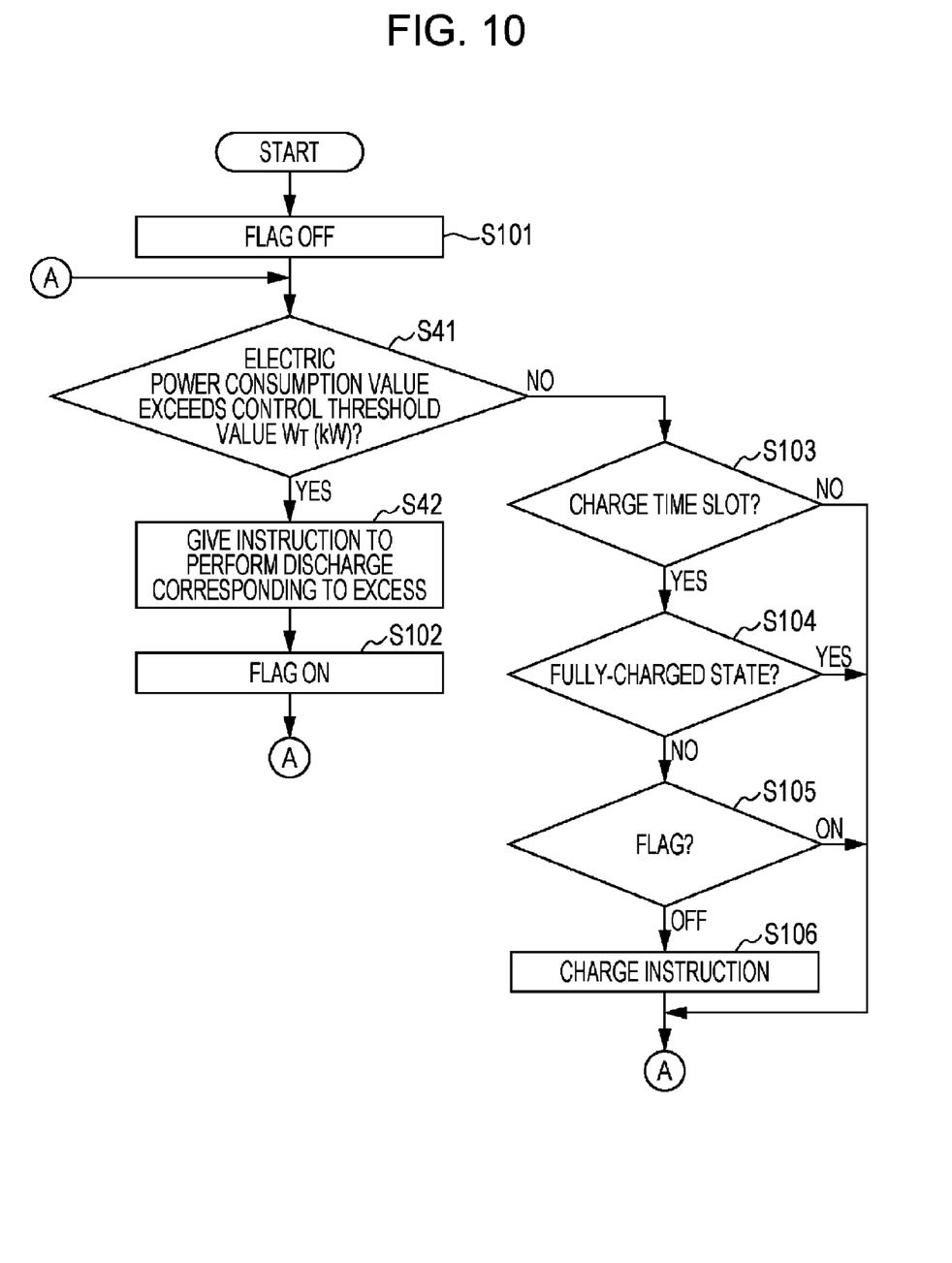
FIG. 10 is a flowchart depicting the flow of processing which is performed by the controlling section.
Figure 11:
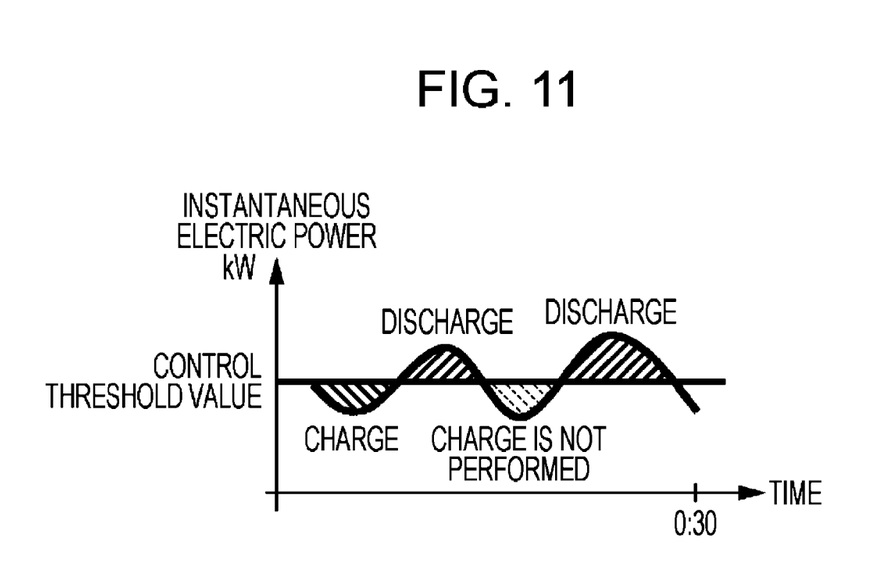
FIG. 11 is a diagram depicting an example of charge and discharge.

FIG. 10 is a flowchart depicting the flow of processing which is performed by the controlling section 16.

A series of processing of FIG. 10 is performed by the demand time period of 30 minutes. First, at the start of the demand time period, the controlling section 16 resets a flag indicating that discharge has been performed in the same demand time period to OFF (S101).

Then, the controlling section 16 acquires the electric power consumption value (kW) measured by the electric power monitor 7 from the electricity storage system 20. If the acquired electric power consumption value (kW) exceeds the current control threshold value $W_T$ (kW) (S41: Yes), the controlling section 16 sends, to the electricity storage system 20, an instruction to discharge the storage battery by an amount corresponding to the excess (S42) and turns on the flag (S102).

If the acquired electric power consumption value (kW) does not exceed the current control threshold value $W_T$ (kW) (S41: No), the controlling section 16 gives a charge instruction (S106) if the time slot is a charge time slot (S103: Yes), the state is not a fully-charged state (S104: No), and the flag is off (S105: OFF).

Since the flag is turned on (S102) if discharge is performed in the same demand time period, the controlling section 16 does not give a charge instruction by step S105 even when the other conditions are then satisfied. Therefore, as depicted in FIG. 11, if the storage battery is discharged in the same demand time period, it is possible to prevent the storage battery from being charged thereafter and reduce the number of times of charge and discharge. Incidentally, in FIG. 11, an area in which a charge instruction is not given even when the control threshold value is not exceeded is indicated by diagonal broken lines.

<Control Method Part 2>

Figure 12:
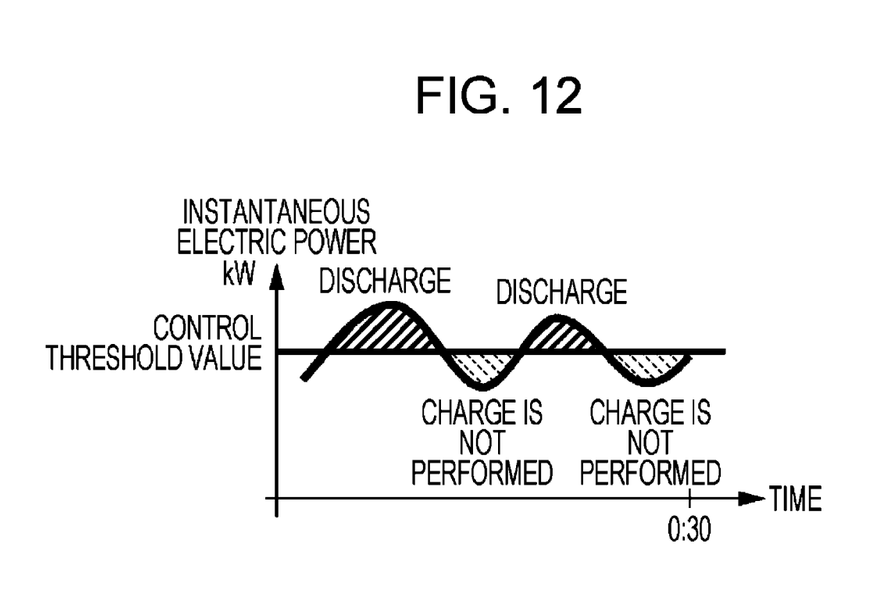
FIG. 12 is a diagram depicting an example of charge and discharge.

A second control method will be described by using FIG. 12. In this method, any one of "a mode in which only discharge of the storage battery is performed and charge is not performed" (mode 1) and "a mode in which only charge of the storage battery is performed and discharge is not performed" (mode 2) is set in advance and, in the case of mode 1, for example, the controlling section 16 performs discharge as depicted in FIG. 12 but does not perform charge irrespective of whether the electric power consumption value is large or small. Incidentally, in FIG. 12, an area in which a charge instruction is not given even when the control threshold value is not exceeded is indicated by diagonal broken lines.

As the utilization method of such a mode, a method is possible in which, for example, the mode is set to mode 1 during the day in which the amount of usage of electric power is large and is set to mode 2 in the middle of the night in which the amount of usage of electric power is small.

<Supplementary Explanation 1>

While the embodiments of the present disclosure have been described above, the present disclosure is not limited to the above descriptions. The present disclosure can be implemented in various modes for achieving the object of the present disclosure and an object related thereto or associated therewith and may be as follows, for example.

(1) In the embodiments, descriptions have been given based on the premise that the peak shaving control devices 10 and 11 and the electricity storage system 20 are different devices, but the peak shaving control devices 10 and 11 and the electricity storage system 20 may be configured as one device having their functions.

(2) In the embodiments, descriptions have been given based on the premise that the electric power monitor 7 measures the electric power consumption value, but the embodiment is not limited thereto. In place of acquiring the electric power consumption value from the electric power monitor 7, the electric power consumption value may be calculated by calculation including a computation by which the charge and discharge electric power value is subtracted from the flow value in the electricity storage system 20 (or the peak shaving control devices 10 and 11). Moreover, calculation may be performed by performing adding-up processing when necessary.

(3) In the embodiments, an example in which, at a time point of update of the control threshold value, the amount of demand electric power to that point in time is used, such as updating the control threshold value based on the amount of demand electric power from 0:00 to 0:15 if the time point of update is 0:15 (see FIG. 6), has been described.

However, the example is not limited thereto, and there may be a slight difference between the points in time due to the influence of the interval between times at which the controlling section 16 acquires the demand electric power, the time of processing required for calculation of demand electric power, and so forth. For example, if the time point of update is 0:15, the control threshold value may be updated based on the amount of demand electric power from 0:00 to 0:14.

(4) In the embodiments, the unit of demand time period is set at 30 minutes, but the length of this time can vary depending on the electric rate structure determined by an electric power company.

(5) Examples of the customer of the embodiments include collective housing such as an apartment building, a commercial facility such as a store, a communal facility, and a disaster prevention base. Incidentally, the embodiments can be applied to all facilities that receive electric power in accordance with an electric rate plan in which the rates are determined depending on the maximum demand value. Moreover, the electric power supply system described in the embodiments is especially useful in a method (a high-voltage block power-receiving method) in which, in the case of collective housing, a cubicle is installed in the collective housing, the high voltage received from the electric power company is transformed by the cubicle, and the low-voltage electric power obtained by transformation is supplied to each housing unit.

(6) In the embodiments, descriptions have been given by taking up the commercial power source as an example of the external power source that performs electric supply from the outside of the customer and taking up the storage battery as an example of the distributed power source, but the examples are not limited thereto.

The examples of the distributed power source may be a solar battery, a fuel cell, and so forth. Moreover, as the distributed power source, other power sources that are installed on the customer's side may be used.

(7) The peak shaving control device of each embodiment may be implemented as large scale integration (LSI) which is typically an integrated circuit. The circuits may be individually implemented as one chip or may be implemented as one chip in such a way as to include all or part of the circuits. The name "LSI" is used here, but, depending on the difference in the degree of integration, it is sometimes called an IC (integrated circuit), system LSI, super LSI, or ultra LSI. Furthermore, the technique of circuit integration is not limited to LSI, and circuit integration may be implemented by a dedicated circuit or a general-purpose processor. A field programmable gate array (FPGA) that is programmable after LSI is produced and a reconfigurable processor that allows the connection and settings of circuit cells in LSI to be reconfigured after the LSI is produced may be used.

In addition, if the circuit integration technology replacing LSI appears by the development of the semiconductor technology or the advent of another derivative technology, it goes without saying that the functional blocks may be integrated by using that technology. The application of the biotechnology, for example, may be possible.

(8) A program for making a processor perform each control processing for implementing the functions of the peak shaving control device depicted in the embodiments can also be distributed by being recorded on a recording medium or via various communication paths or the like.

Such recording media include an IC card, an optical disk, a flexible disk, ROM, and so forth. The distributed control program is used by being stored in a memory or the like from which the control program can be read by the processor, and, as a result of the processor performing the control program, the various functions depicted in the embodiments are implemented.

(9) In the embodiments, descriptions have been given by taking up the electricity storage system as an example of the distributed power source, but the example is not limited thereto.

<Supplementary Explanation 2>

The embodiments include the following aspects.

(1) An electric power control method according to the embodiments is an electric power control method that controls average electric power in a demand time period so as to be less than or equal to a demand target value, the method including: determining a control threshold value at a start of a demand time period based on a demand target value, measuring an amount of demand electric power of a customer which has received an electric power supply from an external power source and consumed electric power from the start of the demand time period to an arbitrary time point during the demand time period, updating the control threshold value based on the measured amount of demand electric power and the demand target value, and supplying electric power to the customer from a distributed power source when an instantaneous value of an electric power consumption of the customer exceeds the control threshold value during the demand time period.

(2) The arbitrary time point may be the time point of update, and, in the updating step, the amount of demand electric power from the start of the demand time period to the time point of update may be measured and the measured amount of demand electric power may be compared with the total amount which is observed when consumption of electric power with a fixed demand target value is continued from the start of the demand time period to the time point of update, if the amount of demand electric power is smaller than the total amount, update by which the control threshold value is increased may be performed, and, if the amount of demand electric power is greater than the total amount, update by which the control threshold value is reduced may be performed.

(3) In the updating step, if the amount of demand electric power is smaller than the total amount, the update may be performed by dividing a value obtained by subtracting the amount of demand electric power from the total amount by a time from the time point of update to the end of the demand time period and adding the value obtained by division to the control threshold value.

(4) In the updating step, the update of the control threshold value may be repeated at predetermined intervals during the demand time period.

(5) In the updating step, the amount of electric power consumption of the customer from the time point of update to the end of the demand time period may be predicted, and, if the total value of the predicted amount of electric power consumption and the amount of demand electric power from the start of the demand time period to the time point of update is smaller than the amount of electric power corresponding to the demand target value, the control threshold value at the time of the update may be increased and, if the predicted amount of electric power consumption is greater than the amount of electric power corresponding to the demand target value, the control threshold value at the time of the update may be reduced.

(6) The distributed power source may be an electricity storage system provided with at least one storage battery, and, in the supplying step, if the instantaneous value of the electric power consumption of the customer exceeds the control threshold value during the demand time period, the storage battery may be discharged and electric power may be supplied to the customer.

(7) A charging step of charging the electricity storage system in a period in which the amount of electric power consumption of the customer is smaller than the control threshold value if determination is made that average demand electric power during the demand time period becomes smaller than or equal to the demand target value during the demand time period may be included.

(8) If the distributed power source is discharged in the supplying step, in the charging step, the distributed power source may not be charged even in a period in which the amount of demand electric power of the customer is smaller than the control threshold value in the same demand time period as the demand time period in which the discharge of the distributed power source is performed.

(9) The control threshold value may be a threshold value for making an average value of the amount of demand electric power of the customer which has received an electric power supply from the external power source and consumed electric power smaller than or equal to the demand target value.

(10) In the supplying step, if the amount of demand electric power of the customer exceeds the control threshold value, the storage battery may be discharged by an amount corresponding to the excess of electric power and, if the amount of demand electric power of the customer does not exceed the control threshold value, electric power supplied from the external power source may be supplied to the customer without the storage battery being charged and discharged.

(11) The customer may be collective housing, a commercial facility, a communal facility, a disaster prevention base, or the like.

(12) The external power source may be a commercial power source.

(13) An electric power control device according to the embodiments is an electric power control device that controls average electric power in a demand time period so as to be smaller than or equal to a demand target value, the device including one or more memories; and circuitry operative to: determine a control threshold value at a start of a demand time period based on a demand target value; measure an amount of demand electric power of a customer which has received an electric power supply from an external power source and consumed electric power from the start of the demand time period to an arbitrary time point during the demand time period; update the control threshold value based on the measured amount of demand electric power and the demand target value; and supply electric power to the customer from a distributed power source when an instantaneous value of an electric power consumption of the customer exceeds the control threshold value during the demand time period.

(14) An electric power control system according to the embodiments is an electric power control system provided with an electric power control device for preventing average electric power in a demand time period from exceeding a demand target value and a storage battery that is connected to the electric power control device via a communication network, in which the electric power control device includes one or more memories; and circuitry operative to: determine a control threshold value at a start of a demand time period based on a demand target value; measure an amount of demand electric power of a customer which has received an electric power supply from an external power source and consumed electric power from the start of the demand time period to an arbitrary time point during the demand time period; update the control threshold value based on the measured amount of demand electric power and the demand target value; and supply electric power to the customer from a distributed power source when an instantaneous value of an electric power consumption of the customer exceeds the control threshold value during the demand time period.

The electric power control method according to the present disclosure is useful because the electric power control method can prevent unnecessary discharge of the distributed power source while preventing the demand value from exceeding the target value by discharge of the distributed power source.

What is claimed is:

1. An electric power control method comprising:
   determining a control threshold value at a start of a demand time period based on a demand target value;
   measuring an amount of demand electric power of a customer which has received an electric power supply from an external power source and consumed electric power from the start of the demand time period to a time point of update during the demand time period;
   updating the control threshold value based on the measured amount of demand electric power and the demand target value; and
   supplying electric power to the customer from a distributed power source when an instantaneous value of an electric power consumption of the customer exceeds the control threshold value during the demand time period,
   wherein, in the updating, the measured amount of demand electric power is compared with a total amount which is observed when consumption of electric power with a fixed demand target value is continued from the start of the demand time period to the time point of update, when the amount of demand electric power is smaller than the total amount, the update is performed by increasing the control threshold value, and when the amount of demand electric power is greater than the total amount, the update is performed by reducing the control threshold value, wherein, when the amount of demand electric power is smaller than the total amount, the update is performed by dividing a value obtained by subtracting the amount of demand electric power from the total amount by a time from the time point of update to an end of the demand time period and adding the value obtained by division to the control threshold value.

2. The electric power control method according to claim 1, wherein the update of the control threshold value is repeated at predetermined intervals during the demand time period.

3. The electric power control method according to claim 1, wherein an amount of electric power consumption of the customer from the time point of update to an end of the demand time period is predicted, and when a total value of the predicted amount of electric power consumption and the amount of demand electric power is smaller than a total amount which is observed when consumption of electric power with a fixed demand target value is continued from the start of the demand time period to the end of the demand time period, the control threshold value at a time of the update is increased, and, when the total value of the predicted amount of electric power consumption and the amount of demand electric power is greater than the total amount which is observed when consumption of electric power with a fixed demand target value is continued from the start of the demand time period to the end of the demand time period, the control threshold value at the time of the update is reduced.

4. The electric power control method according to claim 1, wherein the distributed power source is an electricity storage system provided with at least one storage battery, and when the instantaneous value of the electric power consumption of the customer exceeds the control threshold value during the demand time period, the storage battery is discharged and electric power is supplied to the customer.

5. The electric power control method according to claim 4, further comprising:

charging the electricity storage system in a period in which an amount of electric power consumption of the customer is smaller than the control threshold value when determining that average demand electric power during the demand time period becomes smaller than or equal to the demand target value during the demand time period.

6. The electric power control method according to claim 5, wherein when the distributed power source is discharged, the distributed power source is not charged even in a period in which the amount of demand electric power is smaller than the control threshold value in a same demand time period as the demand time period in which the discharge of the distributed power source is performed.

7. The electric power control method according to claim 1, wherein the control threshold value is a threshold value for making an average value of the amount of demand electric power smaller than or equal to the demand target value.

8. The electric power control method according to claim 4, wherein when the amount of demand electric power exceeds the control threshold value, the storage battery is discharged by an amount corresponding to an excess of electric power, and, when the amount of demand electric power does not exceed the control threshold value, electric power supplied from the external power source is supplied to the customer without the storage battery being charged and discharged.

9. The electric power control method according to claim 1, wherein the customer is collective housing, a commercial facility, a communal facility, or a disaster prevention base.

10. The electric power control method according to claim 1, wherein the external power source is a commercial power source.

11. An electric power control device comprising:

at least one memory; and circuitry operative to:

determine a control threshold value at a start of a demand time period based on a demand target value;

measure an amount of demand electric power of a customer which has received an electric power supply from an external power source and consumed electric power from the start of the demand time period to a time point of update during the demand time period;

compare the measured amount of demand electric power with a total amount which is observed when consumption of electric power with a fixed demand target value is continued from the start of the demand time period to the time point of update, update the control threshold value based on the measured amount of demand electric power and the demand target value; and supply electric power to the customer from a distributed power source when an instantaneous value of an electric power consumption of the customer exceeds the control threshold value during the demand time period, wherein when the amount of demand electric power is smaller than the total amount, the update is performed by increasing the control threshold value, and when the amount of demand electric power is greater than the total amount, the update is performed by reducing the control threshold value, wherein, when the amount of demand electric power is smaller than the total amount, the update is performed by dividing a value obtained by subtracting the amount of demand electric power from the total amount by a time from the time point of update to an end of the demand time period and adding the value obtained by division to the control threshold value.

12. An electric power control system comprising an electric power control device and a storage battery that is connected to the electric power control device via a communication network, wherein the electric power control device includes at least one memory; and circuitry operative to:

determine a control threshold value at a start of a demand time period based on a demand target value;

measure an amount of demand electric power of a customer which has received an electric power supply from an external power source and consumed electric power from the start of the demand time period to a time point of update during the demand time period;

compare the measured amount of demand electric power with a total amount which is observed when consumption of electric power with a fixed demand target value is continued from the start of the demand time period to the time point of update;

update the control threshold value based on the measured amount of demand electric power and the demand target value; and supply electric power to the customer from a distributed power source when an instantaneous value of an electric power consumption of the customer exceeds the control threshold value during the demand time period, wherein when the amount of demand electric power is smaller than the total amount, the update is performed by increasing the control threshold value, and when the amount of demand electric power is greater than the total amount, the update is performed by reducing the control threshold value, wherein, when the amount of demand electric power is smaller than the total amount, the update is performed by dividing a value obtained by subtracting the amount of demand electric power from the total amount by a time from the time point of update to an end of the demand time period and adding the value obtained by division to the control threshold value.

* * * * *